United States Patent [19]
Carter et al.

[11] Patent Number: 6,065,775
[45] Date of Patent: May 23, 2000

[54] AIR-BAG AND A METHOD OF FOLDING AN AIR-BAG

[75] Inventors: Damian Carter, Congleton; Simon Valkenburg, Macclesfield, both of United Kingdom

[73] Assignee: Autoliv Development AB, Vagarda, Sweden

[21] Appl. No.: 09/125,414
[22] PCT Filed: Feb. 19, 1997
[86] PCT No.: PCT/SE97/00268
    § 371 Date: Dec. 14, 1998
    § 102(e) Date: Dec. 14, 1998
[87] PCT Pub. No.: WO97/29933
    PCT Pub. Date: Aug. 21, 1997

[30] Foreign Application Priority Data

Feb. 19, 1996 [GB] United Kingdom .................. 9603460

[51] Int. Cl.[7] .................................................. B60R 21/20
[52] U.S. Cl. ....................................... 280/743.1; 280/729
[58] Field of Search ............................. 280/743.1, 728.1, 280/729.1

[56] References Cited

U.S. PATENT DOCUMENTS 5,094,477  3/1992  Togawa .

FOREIGN PATENT DOCUMENTS

| | | |
|---|---|---|
| 0614786A1 | 9/1994 | European Pat. Off. . |
| 0686527A1 | 12/1995 | European Pat. Off. . |
| 4124506C2 | 1/1993 | Germany . |
| 19541440A1 | 6/1996 | Germany . |
| 2257950A | 1/1993 | United Kingdom . |
| 2257952A | 1/1993 | United Kingdom . |

*Primary Examiner*—Eric Culbreth
*Attorney, Agent, or Firm*—Venable; George H. Spencer; Robert Kinberg

[57] ABSTRACT

An airbag includes two super-imposed layers of fabric which are inter-connected by a peripheral seam. One of the layers of fabric includes a central aperture to receive a gas generator. The two layers of fabric are inter-connected by a breakable seam which defines a rectangular or square region. The bag may be turned inside out. The rectangular seam thus effectively defines the exterior of the inverted bag, facilitating subsequent folding of the bag.

2 Claims, 2 Drawing Sheets

AIR-BAG AND A METHOD OF FOLDING AN AIR-BAG

BACKGROUND OF THE INVENTION

The present invention relates to an air-bag.

A typical air-bag is intended to be mounted on a motor vehicle, and is associated with a gas generator which is adapted to inflate the air-bag in the event that an accident should arise, the inflated air-bag then being positioned to provide protection for the driver or other occupant of the vehicle.

Air-bags may be of many different shapes. A conventional air-bag adapted to be mounted in the hub of a steering wheel is circular, when the bag is un-inflated, and substantially spherical when the bag is inflated. Other air-bags may have different shapes.

A typical air-bag is stored, in a folded state, in a housing. The housing protects the air-bag, to minimize the risk of the air-bag being damaged in any way, both during storage and during inflation.

It is difficult to fold a circular or irregularly-shaped air-bag, so that the air-bag will fit snugly within the housing.

SUMMARY OF THE INVENTION

The present invention seeks to provide an improved air-bag.

According to this invention there is provided an air-bag, the air-bag comprising two super-imposed layers of fabric, the layers of fabric being inter-connected by means which define the outer periphery of the air-bag when in the unfolded state, one layer of fabric being provided with an aperture adapted to receive a gas generator, or means connected to a gas generator, there being a breakable seam inter-connecting the upper and lower layers of fabric defining a substantially rectangular area which surrounds said aperture.

Preferably the breakable seam is defined from a plurality of seam portions, there being spaces between adjacent seam portions.

Conveniently the said breakable seam comprises four seam portions, each of substantially "L"-shape.

In one embodiment the means which define the outer periphery of the bag comprise a peripheral seam, the peripheral seam and the said breakable seam being formed simultaneously with the weaving of the fabric, threads from the upper and lower layers of fabric being inter-woven to form the peripheral seam and relatively weak threads, provided in at least one of the fabric layers, being inter-woven with the threads of the other of the fabric layers to form the breakable seam.

The invention also relates to a method of folding an air-bag comprising the steps of taking an air-bag as described above, turning the air-bag inside-out so that the air-bag has a configuration defined by the shape of the breakable seam, and subsequently folding the air-bag with linear folds.

Conveniently the linear folds comprise concertina folds.

BRIEF DESCRIPTION OF THE DRAWINGS

In order that the invention may be more readily understood and so that further features thereof may be appreciated, the invention will now be described, by way of example, with reference to the accompanying drawings in which.

DETAILED DESCRIPTION OF THE INVENTION

Figure 1:
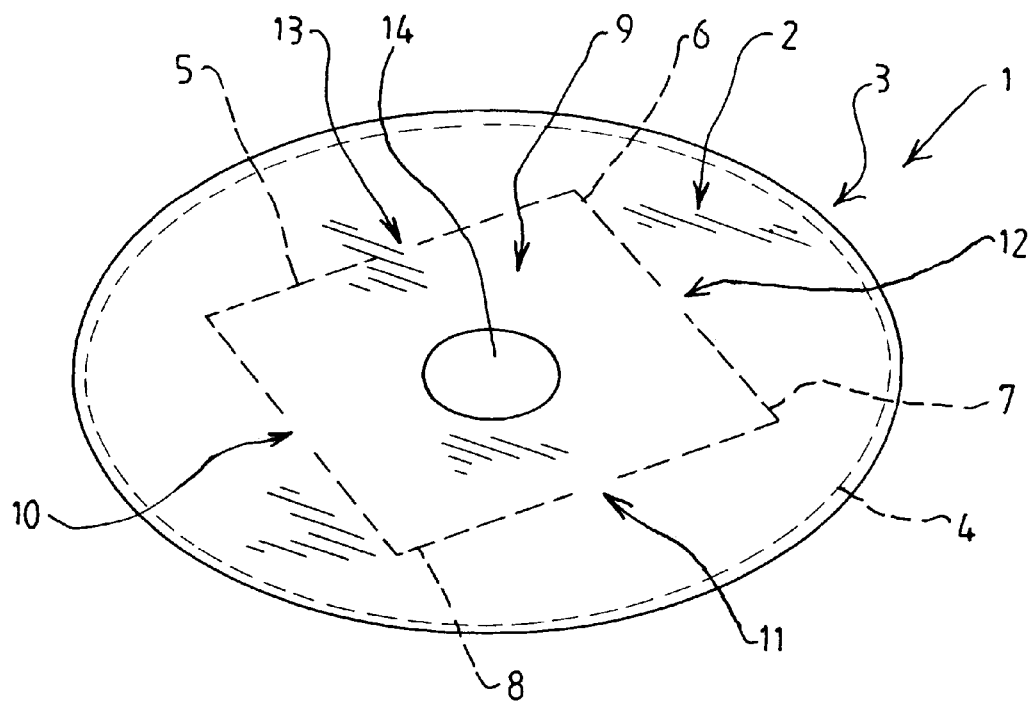
FIG. 1 is a perspective view of an air-bag in accordance with the invention prior to the commencement of folding.

Referring initially to FIG. 1, a circular air-bag is illustrated. This air-bag is intended to be mounted within the hub of a steering wheel, to provide protection for the driver of the vehicle. The air-bag 1 is made of two super-imposed layers of fabric. The layers of fabric may be woven simultaneously as a double-layered web, with parts of the web being inter-connected to form seams.

This may be accomplished by, in selected areas of the web, weaving threads from one of the layers of fabric into the other of the layers of fabric. This technique is disclosed in WO90/09295.

As can be seen from FIG. 1, the upper layer of fabric 2 is connected to the lower layer of fabric 3 by a circular seam 4 which is located adjacent the edge of the air-bag. Four further seams 5, 6, 7 and 8 are provided, each of these seams being of "L"-shaped configuration. The four seams define a rectangular area 9. The threads used to form these seams 5, 6, 7 and 8 are threads which are present for this purpose in one, or in both, of the layers of fabric, and are relatively weak since, as will become apparent from the following description, the seams 5, 6, 7 and 8 are intended to break when the bag is inflated. In contrast the peripheral circular seam 4 is made to be relatively strong.

Small spaces 10, 11, 12, 13 exist between the seams 5, 6 7 and 8.

A circular aperture 14 is formed in the upper layer of fabric 2. It can be seen that the centre of the aperture 14, the centre of the rectangular area 9 and the centre of the circular bag 1 are all coincident. The aperture 14 is intended to receive a gas generator.

Figure 2:
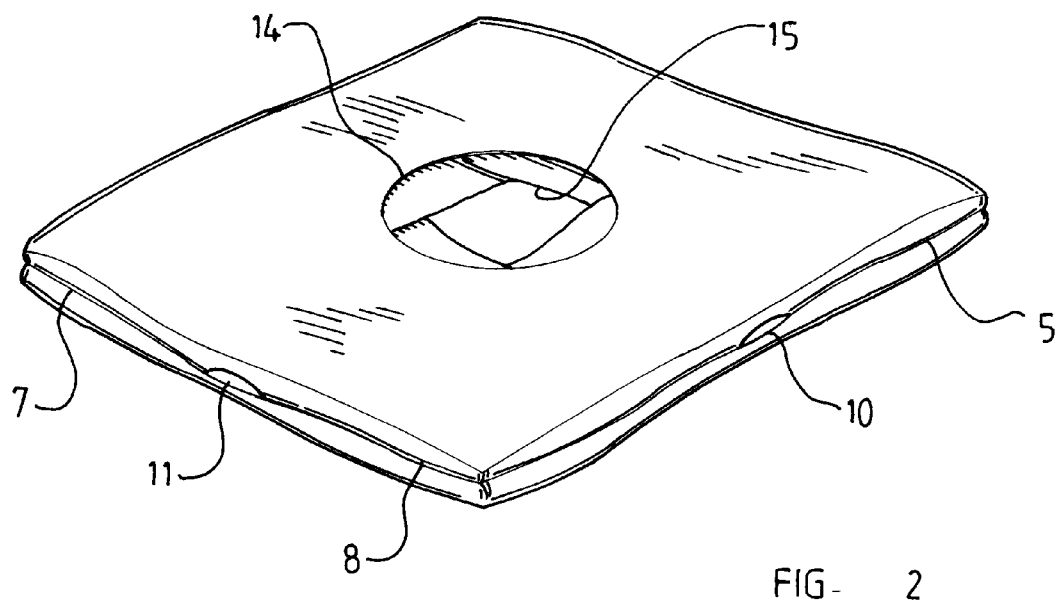
FIG. 2 is a perspective view of the air-bag of FIG. 1 after the commencement of the folding process.

The first step in the process of folding the bag illustrated in FIG. 1, comprises the step of turning the bag inside-out. This is accomplished by passing the whole of the bag through the aperture 14. The bag then presents the appearance illustrated in FIG. 2.

When the bag is turned inside-out, the bag has a rectangular configuration defined by the seams 5, 6 7 and 8. As can be seen from FIG. 2, the aperture 14 is visible, and the rectangular configuration of the exterior of the bag is defined by the seams 5, 6, 7 and 8. The small spaces 10, 11 are visible in FIG. 2.

Through the aperture 14 can be seen parts 15 of the outer periphery of the bag. These are parts of the bag that initially, as shown in FIG. 1, lay outside the area 9. These parts are now contained within the envelope defined by the inside-out bag. There is a space that is present between the now inwardly directed peripheral parts of the bag which can receive part of a gas generator which is inserted into the inside-out bag through the aperture 14.

Figure 3:
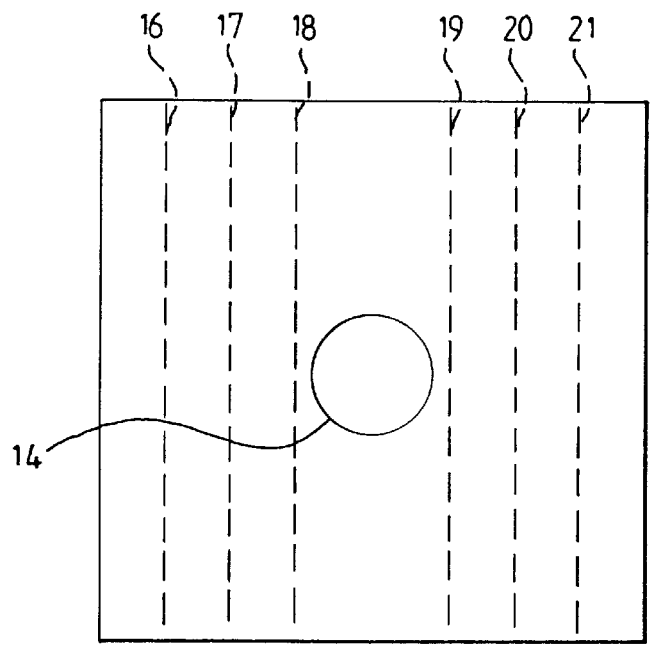
FIG. 3 is a plan view of the air-bag, when in the condition of FIG. 2, illustrating where further folds are to be effected during the subsequent steps in the folding process.

Referring to FIG. 3, the bag 1 is viewed in plan, with the aperture 14 being located at the centre of the bag. It is to be appreciated that since the bag now has a rectangular outer periphery, the bag can easily be folded. Many different folding techniques can be utilized, but in the example given, the bag can be folded concertina-fashion with a plurality of parallel linear fold-lines as indicated at 16–21. Further folds, for example, folds orthogonal to folds 16–21, may subsequently be effected to complete the folding operation.

The folded bag will be connected to a gas generator which will be positioned to inject the gas into the bag through the aperture 14. When the bag is inflated, gas will flow into the space between the upper fabric 2 and the lower fabric 3 in the area 9, thus tending to unfold the concertina folds and commence the deployment of the bag. Gas will also pass through the small spaces 10, 11, 12, 13 between the seams 5, 6, 7 and 8, and consequently gas will be introduced into the region of the bag defined by the fabric layers 2 and 3 outside the area 9. The seams 5, 6, 7 and 8 are designed to be relatively weak, so that the seams will split or separate during the inflation process. This splitting or separating commences at the ends of the seams adjacent the small spaces 10, 11, 12, 13. If the seam were unbroken, the splitting or separating might not commence smoothly and predictably. The threads which extend between the upper layer of fabric and the lower layer of fabric will snap in the seams 5, 6, 7 and 8, causing the disintegration of the seams, whilst retaining the integrity of the upper fabric layer 2 and the lower layer fabric 3, so there is no gas leakage through the fabric layers in the region of the seams.

Initially, the central part of the bag, i.e. the area 9, is inflated. Axial movement of the part of the bag opposite the aperture 14 terminates as the seam 5, 6, 7, 8 begins to break. Subsequently, the radially outer part of the bag on the exterior of the area 9 is inflated, thus urging the peripheral edge seam of the bag radially outwardly. Finally, the part of the bag opposite the aperture 14 continues its axial movement away from the aperture as the bag becomes fully inflated. The speed of movement of the part of the bag opposite the aperture 14 is thus relatively low as the bag becomes fully inflated, thus reducing the risk of the bag itself injuring the occupant of the vehicle that the bag is intended to protect.

Figure 4:
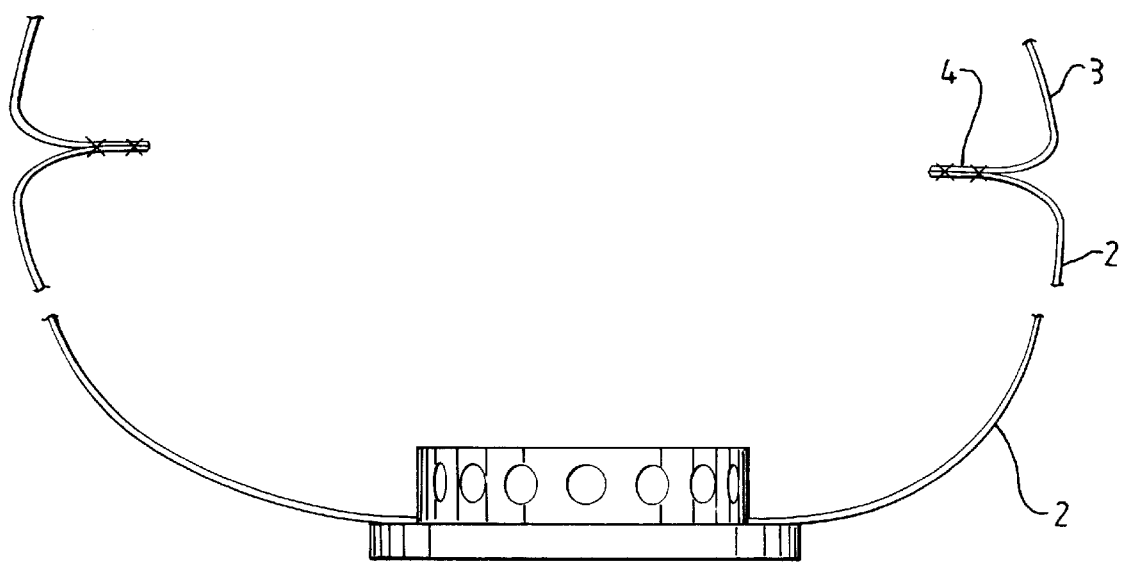
FIG. 4 is a sectional view of part of an air-bag when inflated.

When the bag is fully inflated, as illustrated schematically in FIG. 4, it can be seen that the peripheral seam 4 is located in such a position that the free edges of the fabric sheets are located on the interior of the bag and not on the exterior of the bag. The free edges can be relatively "sharp" and could inflict an injury on an occupant of a vehicle. However, since the free edges are located on the interior of the bag, the free edges are not in a position to inflict any injuries on occupants of the vehicle.

Whilst the invention has been described with reference to one embodiment in which the bag is a circular bag, it is to be appreciated that the invention may be applied to bags of other shapes.

Equally, whilst the invention has been described with reference to an embodiment in which the area defined by the breakable seams is rectangular, the area defined by the breakable seams could be square. Furthermore, whilst in the described embodied four "L"-shaped seams are provided, it is to be appreciated that any appropriate number of weak seams could be provided which define the outer periphery of the rectangular area. Thus, a plurality of very short seams lying on the periphery of the rectangle could be provided, or two substantially "U"-shaped seams could be provided. Alternatively again, two substantially "V"-shaped seams could be provided, the two arms of each "V" defining two sides of the rectangle.

It is to be understood that the rectangular area could be square.

We claim:

1. An air-bag, comprising:

two super-imposed layers of fabric;

means interconnecting the layers of fabric and defining an outer periphery of the air-bag when in an unfolded state, one of the layers of fabric including an aperture adapted to receive a gas generator, or means connected to a gas generator; and a breakable seam inter-connecting the layers of fabric, the breakable seam comprising four L-shaped seam portions arranged to define a substantially rectangular area surrounding the aperture, there being spaces between adjacent L-shaped seam portions.

2. An air-bag according to claim 1, wherein the means which define the outer periphery of the bag comprise a peripheral seam, the peripheral seam comprising interwoven threads from the layers of fabric and the breakable seam comprising relatively weak threads in at least one of the fabric layers inter-woven with threads of the other of the fabric layers.

* * * * *